INVENTOR.
LESLIE L. FRISK
BY
Barney, Fusselle, Raisch & Choate
ATTORNEYS

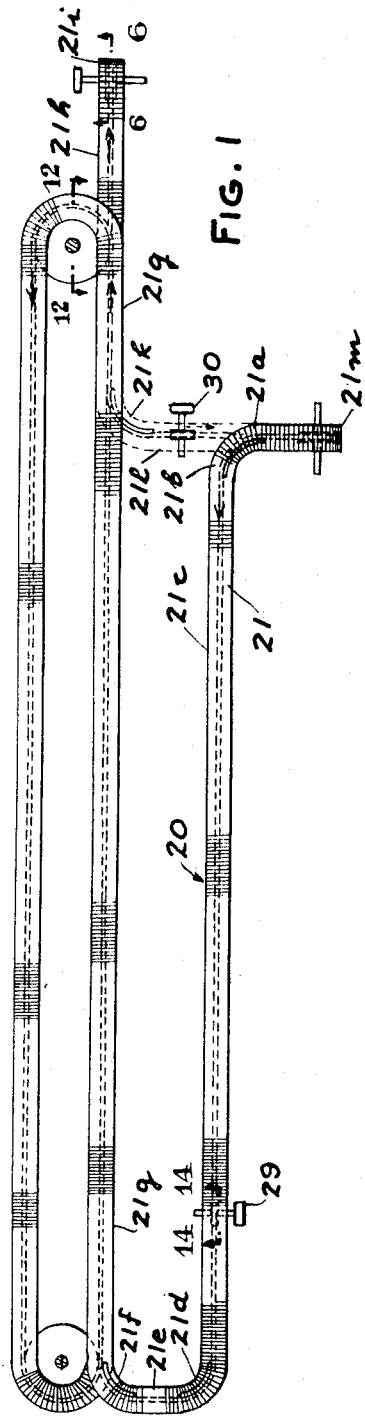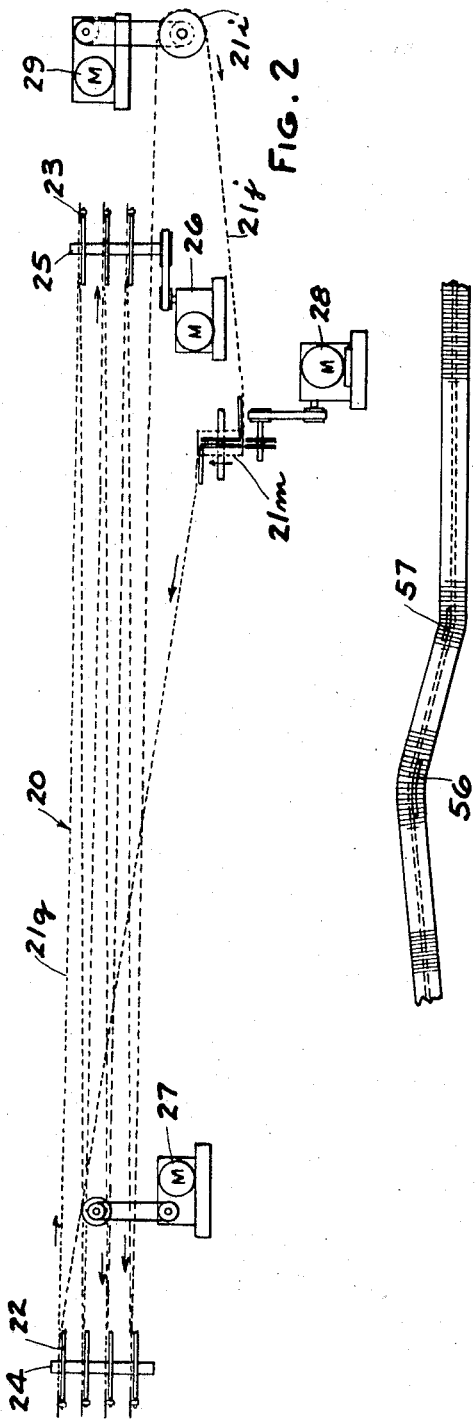

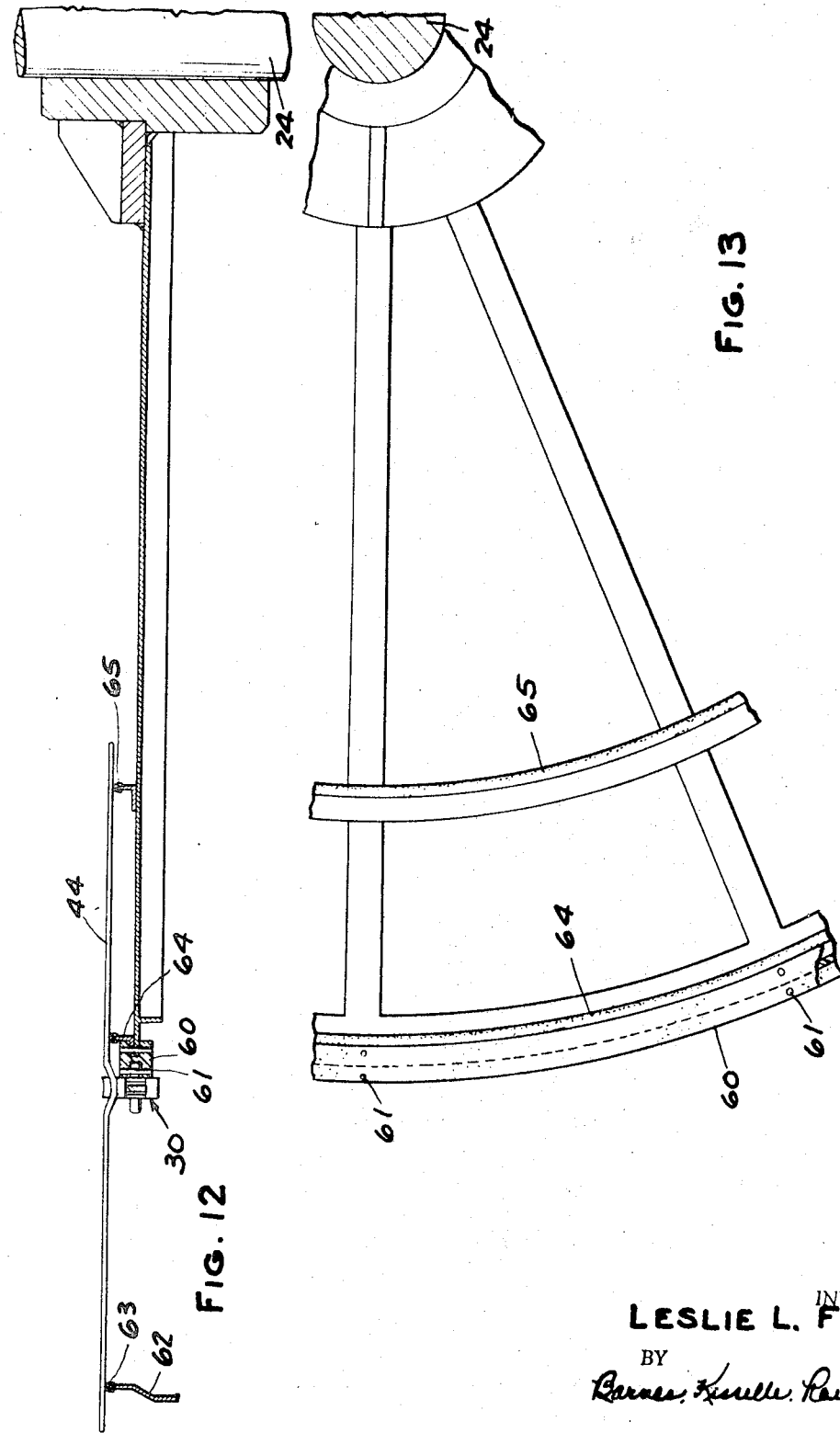

United States Patent Office 3,450,250
Patented June 17, 1969

3,450,250
CONVEYOR SYSTEM
Leslie L. Frisk, Marshall, Mich., assignor to Union Steel Products Company, Albion, Mich., a corporation of Michigan
Filed Apr. 24, 1967, Ser. No. 633,167
Int. Cl. B65g 15/00, 17/00, 19/00
U.S. Cl. 198—136    24 Claims

ABSTRACT OF THE DISCLOSURE

The conveyor system disclosed herein comprises an endless conveyor chain having load supporting members thereon. Portions of the conveyor extend horizontally and change direction horizontally, other portions of the conveyor are inclined and change elevation while still other portions of the conveyor extend in a generally elongated spiral path to provide a storage zone, for example, as needed in the cooling of bread. The conveyor includes a chain comprising a plurality of pairs of links which are interconnected for relative horizontal and vertical pivotal movement relative to one another.

---

This invention relates to conveyor systems and particularly to a conveyor system for conveying lightweight articles such as bread and the like.

Background of the invention

In the handling of lightweight articles such as bread in a bakery, various conveyor systems have been heretofore proposed. It is common to utilize a standard roller chain and to have successive conveyors for moving the bread horizontally, changing the direction of the bread horizontally or vertically, or storing the bread for cooling in a spiral conveyor. Where successive conveyors are used, it is necessary to have a transfer belt in order to transfer from one to the other.

Among the objects of the present invention are to provide a conveyor system which utilizes a single endless conveyor chain of novel construction; which can be utilized not only in moving articles horizontally in a straight line but in moving articles through changes in direction both horizontally and vertically and through storage loops or spirals; which has reduced friction in its various parts; and which will result in relatively low cost and long life.

Summary

The conveyor system disclosed herein comprises an endless conveyor chain having load supporting members thereon. Portions of the conveyor extend horizontally and change direction, other portions of the conveyor are inclined and change elevation while still other portions of the conveyor extend in a generally elongated spiral path to provide a delay, for example, as needed in the cooling of bread. The conveyor includes a chain comprising a plurality of pairs of links which are interconnected for relative horizontal and vertical pivotal movement relative to one another.

Description of the drawings

FIG. 1 is a diagrammatic plan view of a conveyor system embodying the invention.

FIG. 2 is a diagrammatic elevational view of the system shown in FIG. 1.

FIG. 3 is a diagrammatic plan view of a portion of a modified form of conveyor system.

FIG. 12 is a fragmentary sectional view on an enlarged scale taken along the line 12—12 in FIG. 1.

FIG. 13 is a fragmentary plan view of a portion of the conveyor system shown in FIG. 12.

Description

Figure 4:
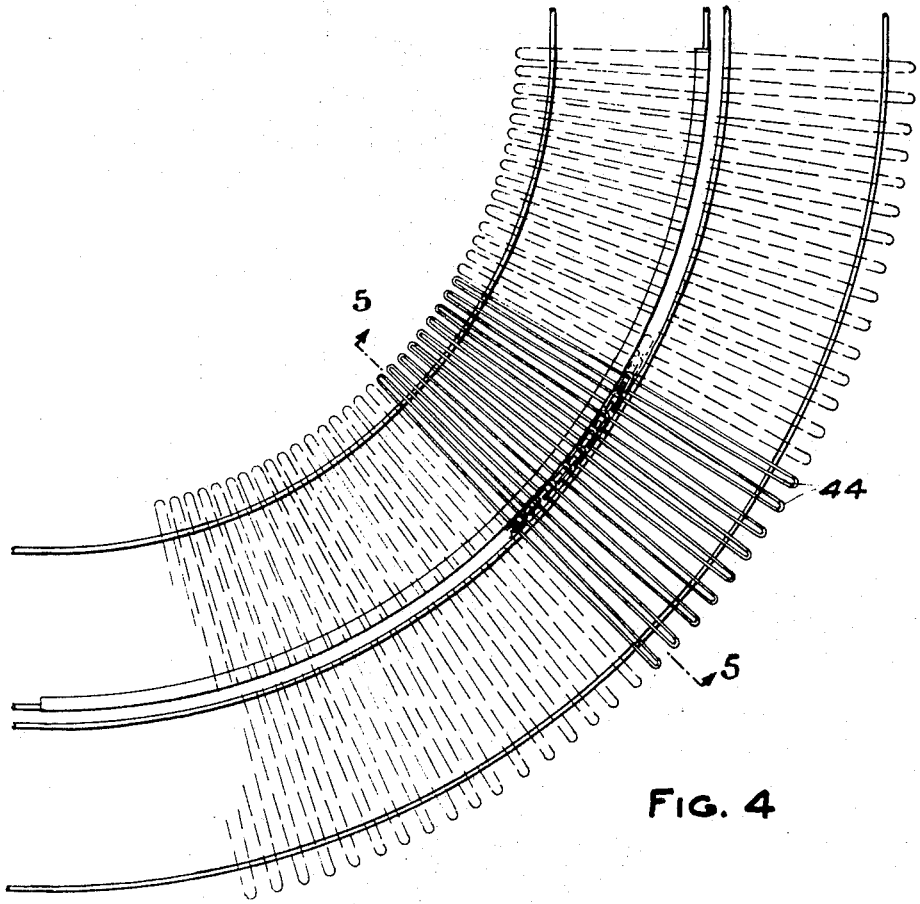
FIG. 4 is a fragmentary plan view on an enlarged scale of a portion of the system shown in FIG. 1.

Referring to FIGS. 1 and 2, conveyor system 20 comprises an endless conveyor 21 that includes portions that move in various directions and at various elevations which for purposes of convenience are designated as a straight portion 21a, a curved horizontal portion 21b, a straight inclined portion 21c, a curved portion 21d, a straight portion 21e, a curved portion 21f, a spiral storage portion 21g, a straight portion 21h, a reverse loop portion 21i, return portions 21j, 21k, 21l and reverse portion 21m. As shown in FIG. 2, the spiral storage portion 21g comprises two pairs of vertically spaced sprockets 22, 23 that are mounted on shafts 24, 25, one of which is driven from a power unit 26. The sprockets 22 are at the same elevations as the sprockets 23 and the conveyor chain is trained back and forth over the sprockets to provide a continuous moving storage portion which can be used, for example, in the cooling of bread. Power units 27–29, as presently described, are provided to power the conveyor 21 as needed.

Referring to FIGS. 4–11, the conveyor 21 comprises a conveyor chain 30 which consists of a plurality of pairs of identical links 31, 32. Each link 31 is generally U-shaped and includes vertical legs 33 joined by a bight portion 34. Each link 32 is generally T-shaped and includes a horizontally extending leg 35 and vertical cross bar 36. Each leg 35 of a link 32 extends through a horizontally extending opening 37 in the bight portion 34 of a link 31 as shown in broken lines in FIG. 10. A horizontal opening 38 is provided in leg 35 of each link 32 and is adapted to be aligned with openings 39 of a preceding link 31. A pin 40 extends through the aligned openings 38, 39 and spacers 41 on each side of the leg 35 to pivot links 31, 32 to one another. The pivotal connection formed by the pin 40 provides for a vertical swinging movement of the links relative to one another and the connection of the cross arm 36 with the succeeding link 31 provides for horizontal pivotal movement of the links.

Figure 9:
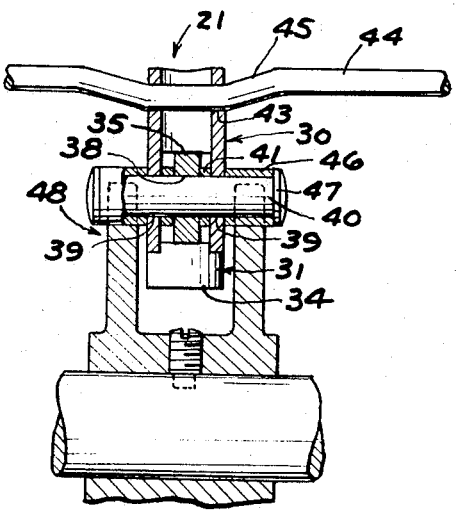
FIG. 9 is a fragmentary sectional view on an enlarged scale taken along the line 9—9 in FIG. 6.
Figure 7:
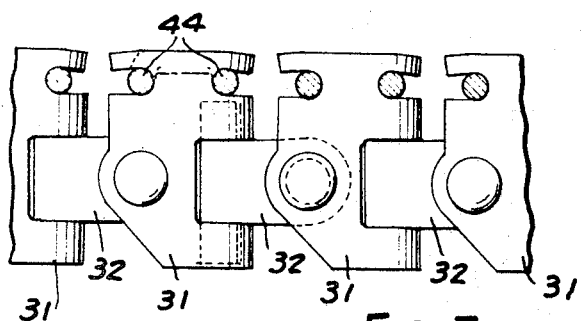
FIG. 7 is a fragmentary side elevational view on an enlarged scale of a portion of the conveyor shown in FIG. 6.
Figure 8:
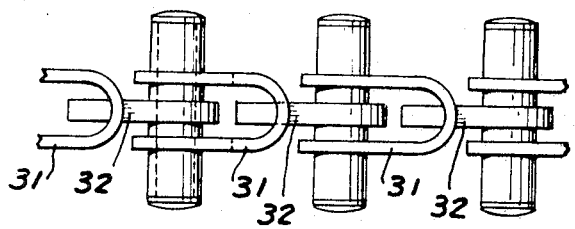
FIG. 8 is a fragmentary plan view of a portion of the conveyor shown in FIG. 7.
Figure 10:
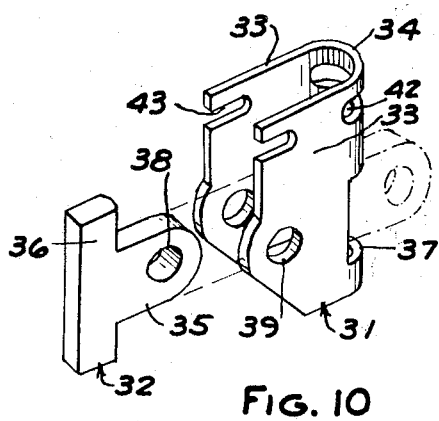
FIG. 10 is a fragmentary perspective view of a pair of links of the conveyor chain.
Figure 11:
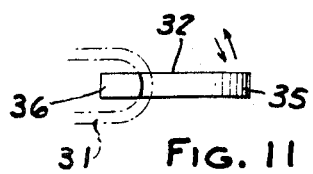
FIG. 11 is a plan view of one of the links.

Each link 31 is formed with an arcuate horizontal slot 42 in the bight portion 34 and horizontal slots 43 in the legs 33 which receive the load supporting members 44, the latter preferably comprising a continuous elongated loop formed of a rod and having the central portion 45 which engages the oppositely facing slots 42, 43 depressed or bent downwardly as shown in FIG. 9. The closed ends of the loop form the peripheral extremities of the load supporting members (FIG. 4).

The ends of the pins 40 extend laterally outwardly and have rollers 46 rotatably mounted thereon and retained thereon by enlarging the ends of the pins as at 47. The rollers 46 are adapted to be engaged by the teeth of power sprockets as for example when the chain is changed in direction upon a return or by power sprockets which engage portions of the chain.

Figure 6:
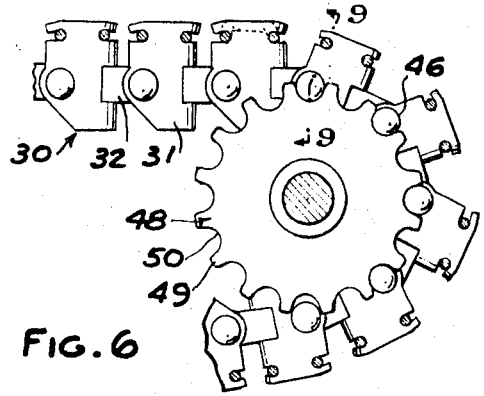
FIG. 6 is a fragmentary sectional view taken along the line 6—6 in FIG. 1 on an enlarged scale.

Thus as shown in FIG. 6, upon return of the conveyor chain, the chain is trained over a sprocket 48 having spaced teeth 49 defining pockets 50 for receiving the rollers 46 and thereby supporting the pins. Depending upon the length and nature of the conveyor system, the sprockets at turn portions may be driven with power or auxiliary power drive devices in the form of sprockets or drive chains can be provided along the conveyor system for engaging the pins to facilitate the movement of the conveyor.

Figure 5:
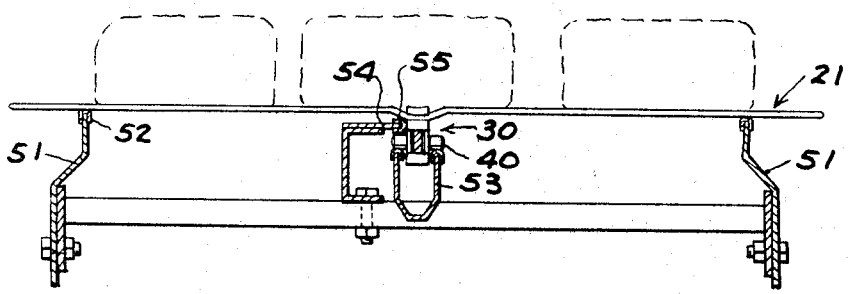
FIG. 5 is a fragmentary sectional view taken along the line 5—5 in FIG. 4.

Throughout the conveyor system, in order to provide for support for the load supporting members, stationary guide rails 51 (FIG. 5) are provided beneath the load supporting members 44. Support members 51 have low friction surfaces formed by strips 52 of low friction material such as nylon on the upper surface thereof.

Where the conveyor changes in direction horizontally as, for example, in the portions 21b, 21d, 21f in FIG. 1, auxiliary guide devices are provided along the center of the conveyor. Thus as shown in FIGS. 4 and 5, a guide member 53 which is horizontally curved is provided along which the pins 40 extend and between which the lower ends of the links 31 move. On the radially innermost portion of the curve, an auxiliary curved guide member 54 having a low friction molding 55 thereon is provided for engaging the side of the links 31 to guide the chain and, in turn, the conveyor through the arcuate movement. As shown in FIG. 4, the spaced portions of the load supporting members 44 taper toward the closed ends thereof minimizing the tendency of the load supporting members to overlap one another on the radially innermost portion of the curve.

It can be appreciated that where the curve changes only slightly in direction horizontally for example as shown in FIG. 3, slightly curved guide members 56, 57 can be provided on the radially innermost portions of the curve to guide the conveyor chain in the same manner as shown in FIGS. 4 and 5.

As shown in FIGS. 12 and 13, the power sprockets 22 which are associated with the spiral storage unit 21g include a peripheral rim 60 which is preferably made of low friction plastic material such as nylon and has circumferentially spaced notches 61 for engaging one end of the pin 40. When the sprockets are driven by the drive 26, this produces a drive on the chain. Throughout the path of movement of the conveyor, support rails 62 are provided as shown in FIG. 12 and have their upper ends preferably formed with a low friction material molding 63 such as nylon. The support rail 62 is provided in fixed position adjacent the periphery of the sprockets 22 and similar additional circular support rails 64, 65 are provided on each sprocket.

Figure 14:
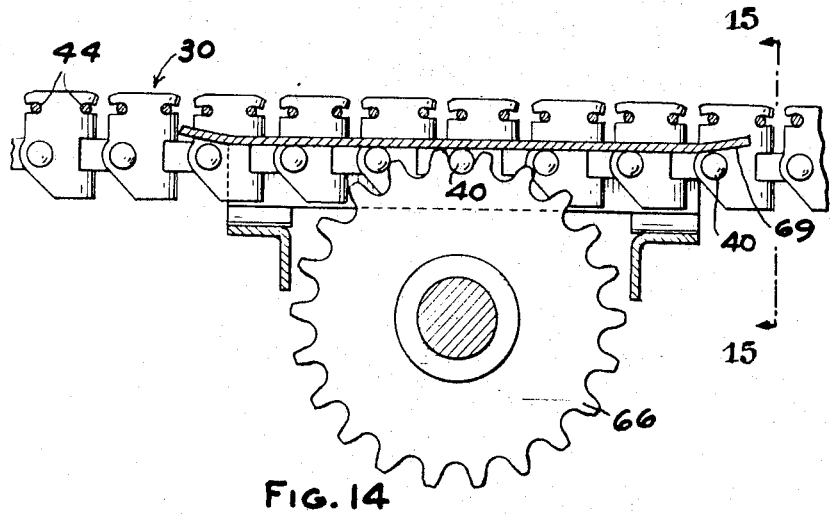
FIG. 14 is a longitudinal sectional view through an auxiliary drive utilized in the conveyor system.
Figure 15:
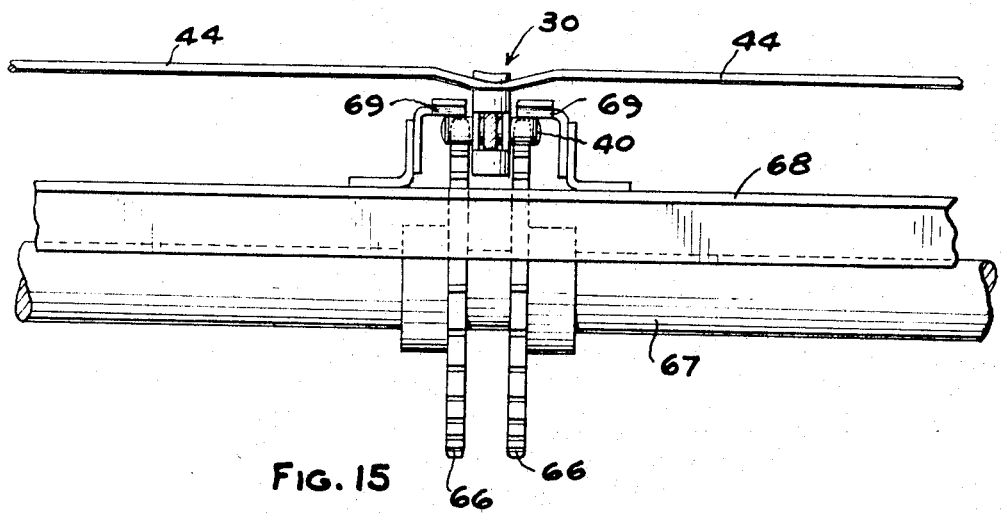
FIG. 15 is a fragmentary sectional view taken along the line 15—15 in FIG. 14.

The auxiliary power devices which are utilized along the length of the conveyor, for example, the power units 27, 28 may be of the type shown in FIGS. 14 and 15 wherein spaced sprockets 66 are supported on a drive shaft 67 beneath the conveyor chain 30 for engagement with the drive pins 40. A bracket 68 supports spaced hold down rails 69 in overlying relation to the pins 40 to maintain the pins in driving engagement with the sprockets 66.

It can thus be seen that there has been provided a conveyor system which utilizes a single conveyor chain that permits movement of the articles through changes in direction both horizontally and vertically and through storage loops or spirals; which has reduced friction in its various parts; and which will result in relatively low cost and long life.

I claim:
1. In a conveyor system, the combination comprising: an endless conveyor chain comprising a plurality of interconnected links;
some of said links having load supporting members thereon;
some portions of said conveyor chain extending in a path that extends other than straight;
some portions of said chain extending in a path that is other than horizontal;
said chain having portions thereof returning at a different horizontal level to complete the endless chain;
the links of said chain comprising a plurality of interconnected links;
means pivotally interconnecting a first link to a preceding link for movement in a substantially single plane;
means for pivoting said first-mentioned link to a successive link for movement in a plane at an angle to said first-mentioned plane;
one of said links having said load supporting members thereon;
one of said links comprising a generally U-shaped member having spaced vertically extending legs connected by a bight portion;
another of said links comprising a generally vertical T-shaped member including a horizontal leg and a vertical cross bar;
the bight portion of said first link having an arcuate opening therein through which the leg of a preceding second link extends;
said leg of a second link and said legs of said first link having aligned openings therein;
and a pin extending through said openings.

2. The combination set forth in claim 1 wherein said pin has portions thereof extending horizontally outwardly and defining drive elements for engagement with power means.

3. The combination set forth in claim 2 including power operated drive means positioned along said conveyor for engaging said pins.

4. The combination set forth in claim 1 wherein said load supporting members comprise rods fixed to the upper end of said first links.

5. The combination set forth in claim 4 wherein said rods are generally U-shaped with the free ends thereof interconnected.

6. The combination set forth in claim 1 wherein said load supporting members comprise a closed loop rod which includes generally parallel spaced portions connected by curved end portions,
said rod being mounted intermediate its ends on said first link.

7. The combination set forth in claim 6 wherein said first link includes generally horizontally extending slots in said legs for receiving the spaced portions of said load supporting members.

8. The combination set forth in claim 1 including sprocket means positioned along the length of the conveyor chain and engaging said pins,
and stationary hold down means for maintaining said pins in engagement with said sprocket means.

9. The combination set forth in claim 1 wherein said conveyor includes stationary guides of low friction material positioned along said conveyor and engaging the underside of said load supporting means.

10. A conveyor chain comprising a plurality of pairs of links including a first link comprising a generally U-shaped member having spaced vertically extending legs connected by a bight portion;
a second link comprising a generally vertical T-shaped member including a horizontal leg and a vertical cross bar;
the bight portion of said first link having an arcuate opening therein through which the horizontal leg of an adjacent second link extends;
said horizontal leg of said second link terminating in a free end which is of less width than the spacing between said legs of said first link and which is located therebetween;

said horizontal leg of said second link and said legs of said first link having aligned openings therein;

a pin extending through said openings, said first and second links each being mounted for pivotal movement with respect to said pin, said pin extending outwardly beyond said links and defining a drive element, and drive means having projecting lugs between which said drive elements are received whereby said chain is driven by said drive means.

11. The combination set forth in claim 10 including load supporting members mounted on the upper end of said first links.

12. The combination set forth in claim 11 wherein said load supporting members comprise generally U-shaped rods with the free ends thereof interconnected.

13. The combination set forth in claim 11 wherein said load supporting members comprise closed loop rods which include generally parallel portions connected by curved end portions, each said rod being mounted intermediate its ends on said first link.

14. The combination set forth in claim 13 wherein said first link includes oppositely facing generally horizontally extending slots in said legs for receiving the spaced portions of said load supporting members.

15. The combination set forth in claim 11 wherein said conveyor includes stationary guides of low friction material positioned along said conveyor and engaging the underside of said load supporting members.

16. The combination set forth in claim 10 wherein said means comprises including sprocket means positioned along the length of the conveyor chain and engaging said pins, and stationary hold down means for maintaining said pins in engagement with said sprocket means.

17. In a conveyor system, the combination comprising:

a frame;

an elongated conveyor chain comprising a series of pairs of first and second interconnected links;

load support members attached to selected ones of said links and extending laterally therefrom;

guide means mounted on said frame and engaging and supporting said load support members at positions spaced laterally from said chain;

the first links each comprising a generally U-shaped member having spaced legs connected by a bight portion, with said legs extending in a direction lengthwise of the chain;

the second links each comprising a T-shaped member including a leg extending lengthwise of the chain and a cross bar extending transversely thereto, the bight portion of said first link having an opening therein through which extends the leg of an adjacent second link, said legs of said first link and said leg of said second link having aligned openings therein;

and a pin extending through said openings for coupling together said first and second links.

18. A conveyor system according to claim 17, in which said legs of said first links each have two oppositely facing slots formed therein and opening in opposite directions lengthwise of said chain, corresponding slots in said legs being laterally aligned with each other, said load support members comprising elongated rods and said rods being received in said slots and being embraced around more than one-half of their circumference so that the rods are fixedly secured to said first links.

19. In a conveyor system, the combination comprising:

a frame;

an elongated conveyor chain having a series of pairs of first and second interconnected links;

a plurality of load support rods rigidly attached to selected ones of said links and extending laterally in opposite directions therefrom;

guide rails mounted on said frame and engaging and supporting said rods at positions spaced laterally from said chain;

the first links each comprising wall means defining a transversely extending cavity and a passage opening in a direction longitudinally of said chain and communicating with said cavity;

the second links each comprising a transversely extending portion pivotally received in a cavity of an adjacent first link for supporting said first and second links for relative pivotal movement about a first axis;

said second link having a longitudinally extending portion extending through said passage and pivot means pivotally interconnecting said longitudinal portion to another link of said chain so that said second link is supported for pivotal movement about a second axis transverse to said first axis; and at least one drive element projecting from selected ones of said links adapted to be engaged by power means for driving said chain.

20. A conveyor system according to claim 19, in which selected ones of links have oppositely facing slots which open in opposite directions longitudinally of the chain, the central portions of said support rods being disposed in said slots and being fixedly retained therein.

21. A conveyor system according to claim 20, in which the walls defining said slots are deformed into at least partially encircling relation to said rods.

22. A conveyor system according to claim 19, including stationary holddown means mounted on said frame and engageable with the upper sides of said drive elements for guiding movement of said conveyor chain.

23. In a conveyor system, the combination comprising:

a frame;

an elongated conveyor chain having a series of pairs of first and second interconnected links;

a plurality of load support rods rigidly attached to selected ones of said links and extending laterally in opposite directions therefrom;

guide rails mounted on said frame and engaging and supporting said rods at positions spaced laterally from said chain;

said chain having drive elements projecting from opposite sides thereof and adapted to be engaged by power means for driving said chain;

a guide member mounted on said frame and having a pair of upstanding legs extending on opposite sides of said chain for engaging and supporting said drive elements on the lower side thereof; and a further guide member mounted on said frame and extending upwardly therefrom, said further guide member engaging a side of said chain closely above said drive elements whereby said chain is closely guided by said guide members.

24. A conveyor chain comprising a plurality of pairs of links including a first link comprising a generally U-shaped member having spaced vertically extending legs connected by a bight portion;

a second link comprising a generally vertical T-shaped member including a horizontal leg and a vertical cross bar;

the bight portion of the first link having an arcuate opening therein through which the horizontal leg of the adjacent second link extends;

said horizontal leg of said second link and said legs of said first link having aligned openings therein;

a pin extending through said openings;

load supporting members mounted on the upper end of said first links, said load supporting members comprising closed loop rods which include generally parallel portions connected by curved end portions, each said rod being mounted intermediate its ends on said first link;

said first link including oppositely facing generally horizontally extending slots in the legs for receiving spaced portions of said load supporting members.

References Cited

UNITED STATES PATENTS

| 1,831,330 | 11/1931 | Thompson | 198—136 |
| 2,960,210 | 11/1960 | Jorgensen | 198—189 X |
| 3,094,206 | 6/1963 | Stewart | 198—189 |
| 3,209,897 | 10/1965 | Rice | 198—189 |
| 3,363,744 | 1/1968 | Green | 198—189 X |

EDWARD A. SROKA, *Primary Examiner.*

U.S. Cl. X.R.

198—189